(12) United States Patent
Ochs et al.

(10) Patent No.: US 7,427,648 B2
(45) Date of Patent: *Sep. 23, 2008

(54) HYDROPHILIC SILOXANE COPOLYMERS AND PROCESS FOR THE PREPARATION THEREOF

(75) Inventors: Christian Ochs, Burghausen (DE); Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 389 days.

This patent is subject to a terminal disclaimer.

(21) Appl. No.: 11/139,900

(22) Filed: May 27, 2005

(65) Prior Publication Data

US 2005/0272862 A1 Dec. 8, 2005

(30) Foreign Application Priority Data

Jun. 3, 2004 (DE) .................... 10 2004 027 003

(51) Int. Cl.
 *C08K 3/20* (2006.01)
(52) U.S. Cl. ...................................... 524/591
(58) Field of Classification Search ................. 556/445; 528/28; 524/591
See application file for complete search history.

(56) References Cited

U.S. PATENT DOCUMENTS

| 5,001,210 | A | 3/1991 | Coury et al. |
| 5,643,581 | A | 7/1997 | Mougin et al. |
| 6,365,697 | B1 | 4/2002 | Kim et al. |
| 6,395,265 | B1 * | 5/2002 | Mougin et al. ............ 424/70.12 |
| 2003/0032726 | A1 | 2/2003 | Shores |
| 2003/0032751 | A1 | 2/2003 | Shores |
| 2006/0155051 | A1 * | 7/2006 | Herzig ....................... 524/588 |

FOREIGN PATENT DOCUMENTS

| EP | 1 178 069 | 2/2002 |
| GB | 1128642 | 9/1968 |
| WO | WO 02/10256 | 2/2002 |
| WO | WO 02/10259 | 2/2002 |
| WO | WO 02/10527 | 2/2002 |
| WO | WO 02/088209 | 11/2002 |
| WO | WO 02/088209 A2 | 11/2002 |
| WO | WO 03/078504 | 9/2003 |
| WO | WO 03/095735 | 11/2003 |
| WO | WO-2004/056907 | * 7/2004 |
| WO | WO 2004/056907 A2 | 7/2004 |

OTHER PUBLICATIONS

Soucek et al., J. Polym. Sci. 2002, 40, 1677-1688.*
English Derwent Abstract AN 2004-533758 [51] corres. to WO 2004/056907 A2.
Patent Abstracts of Japan, vol. 2002, No. 4, Aug. 4, 2002, corres. to JP 2001336071.
Chemical Abstracts 136: 38808, "Softening Agent Compositions Containing Polyoxyalkylene Polysiloxanes for Fabrics".
English Derwent Abstract AN 2002-393539[42] corresp. to WO 02/10259 A1.
English Derwent Abstract AN 2003-833472[92] corresp. to WO 03/078504 A1.
English Derwent Abstract AN 2004-034694[03] corresp. to WO 03/095735 A2.
English Derwent Abstract AN 2002-382419[41] corresp. to WO 02/10256 A1.
English Derwent Abstract AN 2003-058822[05] corresp. to WO 02/088209 A2.
English Derwent Abstract AN 2002-382420[41] corresp. to WO 02/10257 A1.

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

Hydrophilic siloxane copolymers are prepared by
(a) reacting organopolysiloxanes having at least one Si-bonded hydrogen atom with substantially linear oligomeric or polymeric compounds of formula $$R^1\text{-}(A\text{-}C_nH_{2n})_m\text{-}A^1\text{-}H \qquad (I)$$

where $R^1$ is a monovalent optionally substituted, hydrosilylatable hydrocarbyl radical,
A is a bivalent polar organic radical selected from —O—, —C(O)—O—, —O—C(O)—, —O—C(O)—O—, —C(O)—NH—, —NH—C(O)—, urethane radicals and urea radicals,
$A^1$ is a bivalent polar organic radical selected from —O—, —NH— and —NR'—, n is an integer from 1 to 20, and m is zero or a positive integer,
(b) reacting the resulting intermediate with organic compounds which have two or more isocyanate groups, in the presence of further organic compounds (6) reactive toward isocyanate groups and containing at least one tertiary amine group, and
(c) quaternizing the amino-group-containing intermediate from step (b) with an alkylating agent (8),
with the proviso that the water content of the compounds (1) and (2) is lower than 2000 weight ppm.

20 Claims, No Drawings

HYDROPHILIC SILOXANE COPOLYMERS AND PROCESS FOR THE PREPARATION THEREOF

BACKGROUND OF THE INVENTION

1. Field of the Invention

This invention relates to hydrophilic siloxane copolymers and to a process for preparing them.

2. Background Art

U.S. Pat. No. 5,001,210 describes a method of producing polyurethanes wherein telechelic amino-functional siloxanes, after reaction with cyclic carbonates, are converted with di- or polyisocyanates into the target products. Polyethers are used in the form of diamino polyethers, which are costly compared with polyether diols and monols.

EP-A 1 178 069 describes the preparation of polyether urethane intermediates by reaction of alkenyl polyethers with diisocyanates followed by addition thereto of silanes bearing hydrolysis-sensitive groups. Siloxane chain polymers are not obtainable in this way.

Branched polyether siloxanes are known from Chemical Abstracts 136: 38808. Hydrogensiloxanes are simultaneously reacted with divinylsiloxanes and allyl polyethers. Excess polyether remains unreacted in the product mixture. The products are used as textile softeners and are free of urethane and urea groups.

US 2003/0032726 and its equivalent WO 02/088209 describe a reaction product of (A) polyisocyanate, (B) silicone having a dimethylpolysiloxane segment and one or more isocyanate-reactive groups, (C) a reactant having one or more isocyanate-reactive groups and one or more ionizable groups, and (D) optionally, an organic substance having one or more isocyanate-reactive groups but no ionizable groups, and (E) a compound providing a counterion for the ionizable groups, wherein either the silicone (B) or the reactant (C), or both, have a single isocyanate-reactive group.

US 2003/0032751 describes a reaction product of (A) a polyisocyanate, (B) a silicone having a dimethylpolysiloxane segment and one or more isocyanate-reactive groups, (C) a reactant having one or more isocyanate-reactive groups and one or more ionizable groups, and (D) optionally, an organic substance having one or more isocyanate-reactive groups but no ionizable groups, and (E) a compound providing a counterion for the ionizable groups, wherein the average molecular weight of the reaction product is in the range from 600 to 20,000.

The chief purpose of introducing such ionizable groups is to increase the compatibility of the resulting siloxane copolymers with aqueous systems. The state of the art preference is for ammonium groups and especially quaternary ammonium groups (known as quat groups) to be employed as ionizable groups in the case of textile or cosmetic applications, since they interact particularly well with the respective weakly negatively charged substrate surfaces and so are able to lead to improved substantivity and improved laundering durability. The class of quat-functional siloxane-polyether copolymers in WO 02/10256 A1, WO 02/10257 A1, WO 02/10259 A1 and WO 03/078504 A1 may be mentioned here by way of example. However, compounds disclosed in the references cited all are only obtainable via costly and inconvenient multistage syntheses, have merely satisfactory substantivity and possess only limited durability to laundering. In particular, however, the compounds previously cited do not have any self-dispersing properties. The instability of the corresponding aqueous emulsions to basic conditions and also to the action of high mechanical agitation of the kind occurring with state of the art jet systems, for example, may only be counteracted through addition of large amounts of surfactants and/or salts of polyvalent cations, such as $Al_2(SO_4)_3.18H_2O$, $MgCl_2.6H_2O$ or the like (WO 03/095735 A2).

SUMMARY OF THE INVENTION

An object of the present invention therefore is to provide hydrophilic siloxane copolymers in which the hydrophilic segments or blocks are interrupted by organic groups which act as donors or acceptors in the formation of hydrogen bonds and thus lead to a distinctly improved substantivity and durability to laundering. A further object of the present invention is to provide hydrophilic siloxane copolymers which may be prepared by simple processes and which may be easily dispersed in water, particularly copolymers which are self-dispersing, i.e. form an emulsion, especially a microemulsion, without the use of surface-active compounds, and which is stable even in an alkaline medium and under the conditions of state of the art jet applications, i.e., under the influence of shearing forces. These and other objects are achieved by the invention.

DETAILED DESCRIPTION OF THE PREFERRED EMBODIMENT(S)

The invention accordingly provides hydrophilic siloxane copolymers preparable by (a) reacting, in a first step, organopolysiloxanes (1) which have at least one Si-bonded hydrogen atom and preferably two or more Si-bonded hydrogen atoms per molecule, with substantially linear oligomeric or polymeric compounds (2) of the general formula

$$R^1\text{-}(A\text{-}C_nH_{2n})_m\text{-}A^1\text{-}H \quad (I)$$

where $R^1$ is a monovalent optionally substituted hydrocarbyl radical capable of adding Si—H groups in a hydrosilylation reaction, preferably a hydrocarbyl radical having an aliphatic carbon-carbon multiple bond, A is a bivalent polar organic radical selected from the group consisting of —O—, —C(O)—O—, —O—C(O)—, —O—C(O)—O—, —C(O)—NH—, —NH—C(O)—, urethane radical and urea radical, preferably an oxygen atom —O—, $A^1$ is a bivalent polar organic radical selected from the group consisting of —O—, —NH— and —NR'— (where R' is a monovalent hydrocarbyl radical of 1 to 18 carbon atoms), preferably an oxygen atom —O—, n is an integer from 1 to 20, preferably from 1 to 4 and more preferably from 2 or 3, and m is 0 or a positive integer, preferably from 5 to 50, (b) reacting, in a second step, the resulting H-$A^1$-group-containing intermediates (4) of step (a) with organic compounds (5) which have two or more isocyanate groups per molecule, the reaction taking place in the presence of further organic compounds (6) which are reactive toward isocyanate groups and contain at least one tertiary amine group, and (c) in a third step, quaternizing the amino group-containing intermediates (7) from step (b), partially or completely, with an alkylating agent (8), with the proviso that the water content of the compounds (1) and (2) which are used for preparing the hydrophilic siloxane copolymers, is lower than 2000 ppm by weight, preferably less than 1500 ppm by weight, and more preferably less than 1000 ppm by weight, in each case based on the total weight of compounds (1) and (2).

The water content is that at room temperature (20° C.) and the pressure of the ambient atmosphere (1020 Hpa). The siloxane copolymers of the present invention preferably have a viscosity of preferably 1000 to 100,000,000 mPa·s at 25° C. and more preferably 10,000 to 10,000,000 mPa·s at 25° C.

The present invention further provides a process for preparing hydrophilic siloxane copolymers by (a) reacting, in a first step, organopolysiloxanes (1) which have at least one Si-bonded hydrogen atom and preferably two or more Si-bonded hydrogen atoms per molecule, with substantially linear oligomeric or polymeric compounds (2) of the general formula

   (I)

where $R^1$ is a monovalent, optionally substituted hydrocarbyl radical capable of adding Si—H groups in a hydrosilylation reaction, preferably a hydrocarbyl radical having an aliphatic carbon-carbon multiple bond, A is a bivalent polar organic radical selected from the group consisting of —O—, —C(O)—O—, —O—C(O)—, —O—C(O)—O—, —C(O)—NH—, —NH—C(O)—, urethane radical and urea radical, preferably an oxygen atom —O—, $A^1$ is a bivalent polar organic radical selected from the group consisting of —O—, —NH— and —$NR^2$— (where $R^2$ is a monovalent hydrocarbyl radical of 1 to 18 carbon atoms), preferably an oxygen atom —O—, n is an integer from 1 to 20, preferably from 1 to 4 and more preferably from 2 or 3 and m is zero or a positive integer, preferably from 5 to 50, (b) reacting, in a second step, the resulting H-$A^1$-group-containing intermediates (4) of step (a) with organic compounds (5) which have two or more isocyanate groups per molecule, the reaction taking place in the presence of further organic compounds (6) which are reactive toward isocyanate groups and contain at least one tertiary amine group, and (c) in a third step, quaternizing the amino-containing intermediates (7) from step (b), partially or completely, with an alkylating agent (8), with the proviso that the water content of the compounds (1) and (2) which are used for preparing the hydrophilic siloxane copolymers, is lower than 2000 ppm by weight, preferably less than 1500 ppm by weight, and more preferably less than 1000 ppm by weight, in each case based on the total weight of compounds (1) and (2).

The first step of the process, step (a), preferably utilizes linear, cyclic or branched organopolysiloxanes (1) constructed of units of the general formula

   (II)

where

R in each occurrence may be the same or different and is a monovalent optionally substituted hydrocarbyl radical having 1 to 18 carbon atoms per radical, e is 0, 1, 2 or 3, f is 0, 1 or 2, and the sum total of e+f is 0, 1, 2 or 3, with the proviso that each molecule has at least one Si-bonded hydrogen atom, and preferably 2 or more Si-bonded hydrogen atoms.

Preferred organopolysiloxanes (1) have the general formula

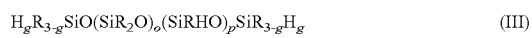   (III)

where R is as defined above, g is 0, 1 or 2, o is 0 or an integer from 1 to 1500, and p is 0 or an integer from 1 to 200, with the proviso that each molecule has at least one Si-bonded hydrogen atom, and preferably two or more Si-bonded hydrogen atoms.

Formula (III) of this invention is to be understood as meaning that the o units of —(SiR$_2$O)— and the p units of —(SiRHO)— may form any desired distribution in the organopolysiloxane molecule.

It is particularly preferable for g in the formula (III) to be 1, for p in the formula (III) to be 0 and for α,ω-dihydrogenpolydiorganosiloxanes and especially α,ω-dihydrogenpolydimethylsiloxanes to be used as organopolysiloxanes (1). The organopolysiloxanes (1) preferably have an average viscosity of 10 to 1000 mPa·s at 25° C.

Examples of examples of R radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m-, and p-tolyl radicals, xylyl radicals and ethylphenyl radicals; and aralkyl radicals, such as the benzyl, α-phenylethyl and β-phenylethyl radicals.

Examples of substituted R radicals are haloalkyl radicals, such as the 3,3,3-trifluoro-n-propyl, 2,2,2,2',2',2'-hexafluoroisopropyl, and heptafluoroisopropyl radicals, and haloaryl radicals, such as the o-, m- and p-chlorophenyl radicals.

The R radical is preferably a monovalent hydrocarbyl radical of 1 to 6 carbon atoms, methyl being particularly preferred. Examples of R radicals fully apply to R' radicals.

$R^1$ is preferably a monovalent hydrocarbyl radical possessing an aliphatic carbon-carbon multiple bond. Examples of $R^1$ radicals are alkenyl radicals such as the vinyl, 5-hexenyl, cyclohexenyl, 1-propenyl, allyl, 3 butenyl and 4-pentenyl radicals, and alkynyl radicals such as the ethynyl, propargyl and 1-propynyl radicals. The $R^1$ radical is preferably an alkenyl radical, especially ω-alkenyl, and the allyl radical is particularly preferred.

Preference for use as oligomeric or polymeric (m>0) compounds (2) is given to polyethers of the general formula

   (IV)

where $R^2$ is a bivalent hydrocarbyl radical of 1 to 20 carbon atoms, preferably a radical of the formula —$CH_2$—, —CH($CH_3$)— or —C($CH_3$)$_2$— and n and m are each as defined above.

Preferred examples of polyethers (2) are those of the general formula

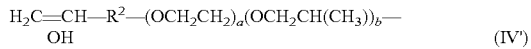
(IV')

where $R^2$ is as defined above and a and b are 0 or an integer from 1 to 200, with the proviso that the sum total of a+b is not less than 1 and is preferably from 5 to 50.

Further examples of oligomeric or polymeric compounds (2) are unsaturated polyesters, such as $H_2C=CH-R^2-[O(O)CC_nH_{2n}]_m$—OH, unsaturated polycarbonates, such as $H_2C=CH-R^2-[OC(O)OC_nH_{2n}]_m$—OH, and unsaturated polyamides, such as $H_2C=CH-R^2-[NHC(O)C_nH_{2n}]_m$—$NH_2$, where $R^2$, n and m are each as defined above.

Preference for use as monomeric (m=0) compounds (2) is given to unsaturated compounds of the formula $H_2C=CH-R^{2'}$—OH, where $R^{2'}$ has the meaning of $R^2$ and is preferably a radical of the formula —$(CH_2)_n$— where n is as defined above. Preferred monomeric compounds (2) are allyl alcohol, 5-hexenol and 7-octenol.

The amounts in which the compounds (2) are used in the first step (a) are preferably in the range from 1.0 to 4.0 and preferably from 1.3 to 2.5 mol of $R^1$ radical, which is preferably a radical having an aliphatic carbon-carbon multiple bond and preferably is an ω-alkenyl radical, per gram atom of Si-bonded hydrogen in organopolysiloxane (1). Excess monomeric compounds (2) used can either be left in the reaction mixture or be wholly or partly removed by distillation insofar as their volatility permits.

The first step (a) preferably utilizes catalysts (3) to promote the addition of Si-bonded hydrogen onto aliphatic unsaturation. Useful catalysts (3) for the process of the present invention include catalysts previously used to promote the addition of Si-bonded hydrogen onto aliphatic unsaturation. The catalysts are preferably a metal from the group of the platinum metals or a compound or complex from the group of the platinum metals.

Examples of such catalysts are metallic and finely divided platinum, which may be provided on a support, such as silicon dioxide, aluminum oxide or activated carbon, compounds or complexes of platinum such as platinum halides, examples being $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes such as platinum-1,3-divinyl-1,1,3,3-tetramethyldisiloxane complexes with or without detectable inorganically bound halogen, bis(gammapicoline)platinum dichloride, trimethylenedipyridineplatinum dichloride, dicyclopentadieneplatinum dichloride, dimethylsulfoxideethyleneplatinum(II) dichloride, cyclooctadieneplatinum dichloride, norbornadieneplatinum dichloride, gamma-picolineplatinum dichloride, cyclopentadieneplatinum dichloride, and also reaction products of platinum tetrachloride with olefin and primary or secondary amine or primary and secondary amine, such as the reaction product of platinum tetrachloride dissolved in 1-octene with sec-butylamine or ammonium-platinum complexes.

The amount in which catalyst (3) is used in the first step (a) is preferably in the range from 1 to 50 ppm by weight (parts by weight per million parts by weight) and more preferably in amounts of 2 to 20 ppm by weight, all calculated as elemental platinum and based on the total weight of organopolysiloxanes (1) and compounds (2).

The first step of the process, step (a), is preferably carried out at the pressure of the ambient atmosphere i.e., at approximately 1020 hPa absolute, but can also be carried out at higher or lower pressures. Furthermore, the first step of the process is preferably carried out at a temperature in the range from 60° C. to 140° C. and more preferably at a temperature in the range from 80° C. to 120° C.

The second step of the process, step (b), preferably utilizes organic compounds (5) which have two or more isocyanate groups per molecule, and have the general formula

(V)

where $R^3$ is a bivalent hydrocarbyl radical having 4 to 40 carbon atoms per radical.

Examples of organic compounds (5) are hexamethylene 1,6-diisocyanate, isophorone diisocyanate, toluene 2,4-diisocyanate, toluene 2,6-diisocyanate, phenylene 1,3-diisocyanate, 4,4'-methylenebis(cyclohexylisocyanate), 4,4'-methylenebis(phenyl isocyanate) and dimethylphenyl diisocyanate.

The amounts in which organic compounds (5) are used in the second step (b) are preferably in the range from 0.5 to 1.0 mol and more preferably in the range from 0.8 to 1.0 mol of isocyanate group per mole of the sum total of isocyanate-reactive groups present in the intermediates (4) and the organic compounds (6). Preferably, somewhat less than 1.0 mole of isocyanate groups per mole of isocyanate reactive groups is employed. By employing no excess of isocyanate groups, their complete reaction is assured, thus alleviating any concern with respect thereto.

US 2003/0032726 and US 2003/0032751, both previously cited, employ polyisocyanate in distinct excess based on isocyanate-reactive groups, in contrast to the process of the present invention. In fact, in the two US references caution against the use of smaller quantities because they increase the viscosity of the product, making it difficult to handle, and necessitating a solvent. There is consequently a distinct prejudice against the present invention's use of polyisocyanate (5) in amounts of 0.5 to 1.0 mol, and in general, in a stoichiometric deficiency.

The second step of the process, step (b), preferably utilizes organic compounds (6) which are reactive toward isocyanate groups and which contain at least one tertiary amine group, of the general formulae

(VI),

(VII),

(VIII),

(IX),

(X), where $R^4$ is an R radical which may optionally contain oxygen, sulfur or nitrogen atoms, preferably a methyl, ethyl or propyl radical which may optionally contain a hydroxyl and/or peralkylated amine radical, $R^5$ is a bivalent hydrocarbyl radical of 1 to 100 carbon atoms, preferably of 1 to 50 carbon atoms and more preferably of 1 to 20 carbon atoms which may be oxygen, sulfur or nitrogen atoms interrupted or substituted, $R^6$ is a trivalent organic radical having 1 to 100 carbon atoms per radical, preferably a trivalent hydrocarbyl radical having 1 to 100 carbon atoms, preferably having 1 to 20 carbon atoms and more preferably having 1 to 10 carbon atoms, which contains one or more oxygen atoms, $R^7$ is a tetravalent organic radical having 1 to 100 carbon atoms per radical, preferably a tetravalent hydrocarbyl radical having 1 to 20 carbon atoms which contains one or more oxygen atoms, $R^8$ is a hydrogen atom or $R^4$, and X is an oxygen atom or a sulfur atom, preferably an oxygen atom.

Examples of organic compounds (6) of the general formula (VI) are N,N-dimethylethanolamine, N,N-diethylpropanolamine, N-(3-aminopropyl)-N-methylethanolamine, N-(dimethyl-3-aminopropyl)-N-methylethanolamine, N,N-dimethyl-2-(2-aminoethoxy)ethanol, N-methyldiethanolamine, N-methyl-dipropanolamine, N-dodecyldiethanolamine, N-stearyldipropanolamine, dimethylaminopropyldipropanolamine, triethanolamine, N,N-bis(dimethyl-aminopropyl)-2-hydroxyethylamine, N,N-bis(dimethylamino-propyl)-2-hydroxypropylamine, N,N-dimethyl-2-mercaptoethylamine, and N,N-diethyl-3-mercaptopropylamine.

Examples of organic compounds (6) of the general formula (VII) are 1,5-bis(dimethylamino)pentan-3-ol, 1,7-bis(dimethylamino)heptan-4-ol, 1,5-bis(dimethylamino)pentan-3-thiol, and 1,7-bis(dimethylamino)heptan-4-thiol.

Examples of organic compounds (6) of the general formula (VIII) are 2,4,6-tris(dimethylaminomethyl)phenol, 1,1,1-tris(dimethylaminomethyl)-methanol, 2,4,6-tris(dimethylaminomethyl)cyclohexanol, 2,4,6-tris(dimethyl-aminomethyl)thiophenol, 1,1,1-tris(dimethylaminomethyl)methanethiol, and 2,4,6-tris(dimethylaminomethyl)cyclohexanethiol.

Examples of organic compounds (6) of the general formula (IX) are N,N-bis(dimethylaminopropyl)-3-aminopropane-1,2-diol, N,N-bis(dimethyl-aminopropyl)-2-aminopropane-1,3-diol, and N,N-bis(3-dimethylamino-propyl)carbaminomonoglyceride.

Examples of organic compounds (6) of the general formula (X) are N,N-dimethylethylenediamine, N,N-diethylethylenediamine, N,N-dimethyl-N'-methylethylenediamine, N,N-dimethylpropylenediamine, N,N-dimethyl-N'-methylpropylenediamine, N,N-bis(dimethyl-3-aminopropyl)amine, N,N-bis-(3-aminopropyl)methylamine, N-methyl-N'-(2-aminoethyl)piperazine, N-(3-aminopropyl)morpholine, and N-(3-aminopropyl)imidazole.

The compounds of the formula (VI) to (X) thus serve to introduce quaternizable nitrogen into the siloxane copolymer.

The amounts in which organic compounds (6) are used in the second step (b) are preferably in the range from 0.01 to 1 mol, and more preferably in the range from 0.05 to 1 mol of HX or $HR^8N$ group per mole of $H-A^1$ group in intermediate (4).

The second step of the process, step (b), is preferably carried out at the pressure of the ambient atmosphere i.e., at approximately 1020 hPa absolute, but can also be carried out at higher or lower pressures. Furthermore, the second step of the process is preferably carried out at a temperature in the range from 40° C. to 140° C. and more preferably at a temperature in the range from 60° C. to 100° C.

The reaction in the second step (b) of the process may further utilize condensation catalysts (9), such as di-n-butyltin dilaurate, tin(II) octoate, dibutyltin diacetate, zinc dilaurate, bismuth trilaurate, potassium octoate, or tertiary amines without any further functional groups reactive toward isocyanate groups, examples being N,N-dimethylcyclohexylamine, N,N,N-,N'''N'''-pentamethyldipropylenetriamine, N-methylimidazole or N-ethylmorpholine.

The third step (c) of the process utilizes alkylating agents (8) which are preferably selected from alkyl halides, dialkyl sulfates, sulfonic esters, epoxides, chlorohydrins and onium salts of oxygen or of sulfur, more preferably selected from alkyl halides, sulfonic esters and epoxides.

Examples of suitable alkylating agents (8) are methyl chloride, ethyl chloride, methyl bromide, ethyl bromide, methyl iodide, ethyl iodide, dodecyl bromide, benzyl chloride, chloroacetic acid and chloroacetic ester, dimethyl sulfate, diethyl sulfate, the methyl esters of fluorosulfonic acid, of chlorosulfonic acid, of methanesulfonic acid, of trifluoromethanesulfonic acid, of p-toluenesulfonic acid and of naphthylsulfonic acid, 2,2-dimethyloxirane, 1,2-propylene oxide, 1,2-epoxybutane, 2,3-epoxypropyl isopropyl ether, 2,3-epoxypropyl butyl ether, allyl glycidyl ether, 2,3-epoxypropyltrimethylammonium chloride, 3-chloro-1-methoxy-2-propanol, 3-chloro-1,2-propanediol, epichlorohydrin, 3-chloro-2-hydroxypropyltrimethylammonium chloride and also Meerwein salts, such as trimethyloxonium tetrafluoroborate, triethyloxonium hexafluorophosphate and trimethylsulfonium hydroxide. Preferred examples are methyl chloride, methyl iodide, dodecyl bromide, benzyl chloride, chloroacetic acid, dimethyl sulfate and methyl p-toluenesulfonate.

Alkylating agents (8) are preferably used in the third step (c) of the process in amounts of 0.1 to 1.1 mol and more preferably 0.2 to 1 mol per mole of tertiary amine group in intermediates (7).

The third step of the process, step (c), is preferably carried out at the pressure of the ambient atmosphere i.e., at approximately 1020 hPa absolute, but can also be carried out at higher or lower pressures. Furthermore, the third step of the process is preferably carried out at a temperature in the range from 0° C. to 200° C. and more preferably at a temperature in the range from 20° C. to 150° C., yet more preferably in the range from 50° C. to 130° C.

A preferred siloxane copolymer is obtained, for example, by reacting, in a first step, in excess of α,ω-dihydropolydiorganosiloxane (1) with a polyether (2) of the formula (IV), reacting, in a second step the intermediate (4) produced in the first step, an HO-polyether-polysiloxane-polyether-OH, in the presence of a tertiary alkanolamine (6) of the formula (VI) with a diisocyanate (5) of the formula (V) thus introducing urethane and tertiary amine groups into the siloxane copolymer and also binding free polyether from the first step by urethane formation, and of quaternizing the intermediate (7), a polysiloxane-polyether copolymer consisting of the repeat unit

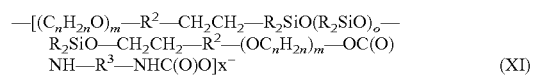

(XI)

and also the end groups

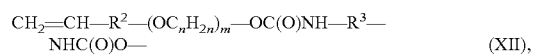

(XII), or as the case may be,

(XII')

and

(XIII), or as the case may be, $$-R^5-NR^4{}_2 \quad (XIII')$$

where R, $R^2$, $R^3$, $R^4$, $R^5$, n, m and o are each as defined above and x is an integer from 1 to 20 and preferably from 1 to 4, with methyl p-toluenesulfonate as an alkylating agent (8). The siloxane copolymer thus obtained consists of the repeat unit $$-[(C_nH_{2n}O)_m-R^2-CH_2CH_2-R_2SiO(R_2SiO)_o-\\R_2SiO-CH_2CH_2-R^2-(OC_nH_{2n})_m-OC(O)\\NH-R^3-NHC(O)O]x- \quad (XI)$$

and also the end groups $$CH_2=CH-R^2-(OC_nH_{2n})_m-OC(O)NH-R^3-\\NHC(O)O- \quad (XII),$$

or as the case may be, $$-(C_nH_{2n}O)_m-R^2-CH=CH_2 \quad (XII')$$

$$R^4{}_2N-R^5-OC(O)NH-R^3-NHC(O)O- \quad (XIII)$$

or $$-R^5-NR^4{}_2 \quad (XIII')$$

and $$[(CH_3)R^4{}_2N-R^5-OC(O)NH-R^3-NHC(O)O-]^+\\CH_3C_6H_4SO_3- \quad (XIV),$$

or as the case may be, $$[-R^5-NR^4{}_2(CH_3)]^+CH_3C_6H_4SO_3^- \quad (XIV'),$$

where R, $R^2$, $R^3$, $R^4$, $R^5$, n, m, o and x are each as defined above.

A further preferred siloxane copolymer is for example obtained similarly to the above-described procedure by utilizing a tertiary amine (6) of the formula (X) in the second step of the process. The siloxane copolymer obtained then consists of the repeat unit $$-[(C_nH_{2n}O)_m-R_2-CH_2CH_2-R_2SiO(R_2SiO)_o-\\R_2SiO-CH_2CH_2-R^2-(OC_nH_{2n})_m-OC(O)\\NH-R^3-NHC(O)O]_x- \quad (XI)$$

and also the end groups $$CH_2=CH-R^2-(OC_nH_{2n})_m-OC(O)NH-R^3-\\NHC(O)O- \quad (XII),$$

or as the case may be, $$-(C_nH_{2n}O)_m-R^2-CH_2CH_2-R_2SiO(R_2SiO)_o-\\R_2SiO-CH_2CH_2-R^2-(OC_nH_{2n})_m-OC(O)\\NH-R^3-NHC(O)O-(C_nH_{2n}O)_m-R^2-\\CH=CH_2 \quad (XII'),$$

$$R^4{}_2N-R^5-NR^8-C(O)NH-R^3-NHC(O)O- \quad (XIII),$$

or as the case may be, $$-(C_nH_{2n}O)_m-R^2-CH_2CH_2-R_2SiO(R_2SiO)_o-\\R_2SiO-CH_2CH_2-R^2-(OC_nH_{2n})_m-OC(O)\\NH-R^3-NHC(O)-NR^8-R^5-NR^4{}_2 \quad (XIII')$$

and $$[(CH_3)R^4{}_2N-R^5-OC(O)NH-R^3-NHC(O)O-]^+\\CH_3C_6H_4SO_3- \quad (XIV),$$

or as the case may be, $$[-(C_nH_{2n}O)_m-R^2-CH_2CH_2-R_2SiO(R_2SiO)_o-\\R_2SiO-CH_2CH_2-R^2-(OC_nH_{2n})_m-OC(O)\\NH-R^3-NHC(O)-NR^8-R^5-NR^4{}_2(CH_3)]^+\\CH_3C_6H_4SO_3-^5 \quad (XIV'),$$

where R, $R^2$, $R^3$, $R^4$, $R^5$, $R^8$, n, m, o and x are each as defined above.

The urethane groups in the hydrophilic siloxane copolymers of the present invention can act as donors and acceptors in the formation of hydrogen bonds, while the quaternary nitrogen groups serve to increase the hydrophilicity and solubility of the hydrophilic siloxane copolymers and also to improve the stability of the aqueous emulsions in a basic medium and under the conditions of state of the art jet systems, i.e., under the influence of shearing forces.

To reduce the sometimes very high product viscosities, low molecular weight materials such as alcohols or ethers can be added, if appropriate. Examples thereof are ethanol, isopropanol, n-butanol, 2-butoxyethanol, diethylene glycol monobutyl ether, tetrahydrofuran, diethylene glycol diethyl ether and dimethoxyethane, of which diethylene glycol monobutyl ether is a preferred example. Preferred quantities added in the case of very viscous products are up to 50% by weight and more preferably up to 30% by weight, based on the hydrophilic siloxane copolymers of the present invention. Such additions also have the advantage that the resultant products are yet easier to disperse in water than the pure siloxane copolymers.

The siloxane copolymers of the present invention are easy to disperse in water without further auxiliaries such as emulsifiers, i.e., are self-dispersing, and produce emulsions and especially microemulsions. The present invention accordingly provides emulsions and preferably microemulsions comprising (A) hydrophilic siloxane copolymers according to the present invention, and (B) water. The content of the hydrophilic siloxane copolymers (A) in the emulsion is preferably in the range from 20% to 60% and more preferably in the range from 30% to 50%, by weight.

The present invention further provides a process for producing the emulsions, preferably microemulsions, by mixing of (A) hydrophilic siloxane copolymers according to the present invention, with (B) water. Technologies for producing silicone emulsions are known. Silicone emulsions are typically produced by simply stirring the siloxane copolymers of the present invention with water and if appropriate subsequent homogenization with rotor-stator homogenizers, colloid mills or high pressure homogenizers.

The siloxane copolymers of the present invention and/or their emulsions can be used as hydrophilic softeners in the textile industry, as hydrophilic rinse cycle fabric conditioners or as hydrophilic additives in the production and finishing of fibers and nonwovens. The compounds of the present invention are notable in particular for their simple synthesis, their high substantivity, the ease of production of their aqueous emulsions (self-dispersion) and also for their high stability in a basic medium and under the application of state of the art jet systems, i.e., under the influence of shearing forces. In addition, the compounds of the present invention and their emulsions endow textile wovens, fibers, and nonwovens, with a high hydrophilicity and also excellent softness coupled with very good durability to laundering.

In the examples, all viscosity data are based on a temperature of 25° C., and are carried out at a pressure of the ambient atmosphere, i.e., at approximately 1020 hPa, and at room temperature, i.e., at about 23° C., or at a temperature which results when the components are added together at room temperature without additional heating or cooling. Furthermore, all parts and percentages are by weight, unless otherwise stated.

EXAMPLE 1

500 g of an α,ω-dihydropolydiorganosiloxane having 0.055% by weight of Si-bonded hydrogen and a water content of 50 ppm by weight are mixed with 203 g of a polyether of the formula

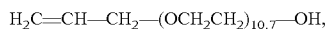

containing 686 weight ppm of water, and heated to 100° C. 0.8 g of hexachloroplatinic acid solution (0.48% by weight based on elemental platinum) is metered in, whereupon the temperature of the reaction mixture rises to 120° C. and a clear product is formed. Complete conversion of the Si-bonded hydrogen is achieved after one hour at 100° C. to 110° C. The polyether-polysiloxane intermediate has a viscosity of about 820 mm$^2$/s at 25° C.

9.81 g of N,N-dimethylethanolamine and 41.6 g of hexamethylene diisocyanate (0.999 mol of isocyanate group per mole of the total isocyanate-reactive groups in intermediate (4) and N,N-dimethylethanolamine (6)) are then metered in succession and the reaction mixture stirred at 100° C. for one hour. During this time, a distinct increase in viscosity takes place. The intermediate thus obtained contains about 14.57 meq./100 g, of protonatable amine groups.

After cooling down to 80° C., 150 g of diethylene glycol monobutyl ether and also 20.5 g of methyl p-toluenesulfonate are added and the batch is left to stir at that temperature for a further hour to give a clear brownish oil.

40 g of the highly viscous oil are mixed with 60 g of water at 50° C. Gentle stirring produces an emulsion having a urethane content of 0.214 meq/g (Emulsion 1).

COMPARATIVE EXAMPLE 1

The synthesis of Example 1 is repeated except that, after the intermediate has been dissolved in diethylene glycol monobutyl ether, a protonation of the tertiary amine groups with 6.6 g of acetic acid (100%) is carried out instead of the alkylation with methyl p-toluenesulfonate. A clear, slightly brownish oil is obtained.

40 g of the highly viscous oil are mixed with 60 g of water at 50° C. Gentle stirring produces an emulsion having a urethane content of 0.268 meq/g (Comparative Emulsion 1).

EXAMPLE 2

500 g of an α,ω-dihydropolydiorganosiloxane having 0.055% by weight of Si-bonded hydrogen and a water content of 50 weight ppm are mixed with 807.7 g of an allyl alcohol ethoxylate/propoxylate of the formula

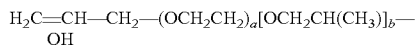

having an a:b ratio=1.0, a water content of 978 weight ppm and an iodine number of 12.1 (the iodine number indicates the amount of iodine, in grams, consumed in the course of the addition onto the aliphatic unsaturation per 100 grams used of material to be investigated) and heated to 100° C. 1.63 g of hexachloroplatinic acid solution (0.48% by weight based on elemental platinum) are then metered in, whereupon the temperature of the reaction mixture rises to 120° C. and a clear product is formed. Complete conversion of the Si-bonded hydrogen is achieved after two hours at 100° C. to 110° C. The polyether-polysiloxane intermediate has a viscosity of about 1120 mm$^2$/s at 25° C.

10.3 g of N,N-bis(dimethyl-3-aminopropyl)amine, 37 g of hexamethylene diisocyanate and 1 drop of di-n-butyltin dilaurate are metered in succession and the mixture left to stir at 100° C. for one hour, during which a distinct increase in viscosity takes place. The intermediate thus obtained contains about 8.107 meq/100 g, of protonatable amine groups.

The batch is subsequently cooled down to 80° C., admixed with 275 g of diethylene glycol monobutyl ether and also 20.48 g of methyl p-toluenesulfonate and left to stir at 80° C. for a further hour to give a clear, slightly yellowish oil which no longer contains protonatable amine groups.

40 g of the highly viscous oil are mixed with 60 g of water at 50° C. Gentle stirring produces an emulsion having a urethane content of 0.106 meq./g (Emulsion 2).

EXAMPLE 3

Into 100 g of the polyether-polysiloxane intermediate of Example 1 (OH content: about 0.548 meq./g) are metered in succession 2.94 g of N,N-bis(dimethyl-3-aminopropyl) amine, 5.92 g of hexamethylene diisocyanate and 1 drop of di-n-butyltin dilaurate, and the mixture left to stir at 100° C. for one hour, during which a distinct increase in viscosity takes place. The intermediate thus obtained contains about 28.84 meq/100 g, of protonatable amine groups.

The batch is subsequently cooled down to 80° C., admixed with 23 g of diethylene glycol monobutyl ether and 5.83 g of methyl p-toluenesulfonate and left to stir at 80° C. for a further hour to give a clear, slightly brownish oil which no longer contains protonatable amine groups.

40 g of the highly viscous oil are mixed with 60 g of water at 50° C. Gentle stirring produces an emulsion having a urethane content of 0.205 meq./g (Emulsion 3).

EXAMPLE 4

Into 500 g of the polyether-polysiloxane intermediate of Example 1 (OH content: about 0.548 meq./g) are metered in succession 22.32 g of a polyether of the formula

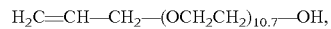

containing 686 weight ppm of water, 19.74 g of N,N-bis (dimethyl-3-aminopropyl)amine and 35.45 g of hexamethylene diisocyanate and the mixture left to stir at 100° C. for one hour, during which a distinct increase in viscosity takes place. The intermediate thus obtained contains about 36.5 meq/100 g, of protonatable amine groups.

The batch is subsequently cooled down to 80° C., admixed with 154 g of diethylene glycol monobutyl ether and 39.25 g of methyl p-toluenesulfonate and left to stir at 80° C. for a further hour to give a clear, slightly brownish oil which no longer contains protonatable amine groups and which is soluble in water by gentle stirring to form an emulsion.

EXAMPLE 5

Example 4 is repeated except that just 19.63 g of methyl p-toluenesulfonate are employed as alkylating agent. The viscous oil thus obtained still contains 14 meq./100 g of protonatable amine groups. The product dissolves in water by gentle stirring to form an emulsion.

EXAMPLE 6

500 g of an α,ω-dihydropolydiorganosiloxane having 0.18% by weight of Si-bonded hydrogen and a water content of 35 weight ppm are mixed with 664.4 g of a polyether of the formula $$H_2C=CH-CH_2-(OCH_2CH_2)_{10.7}-OH,$$

containing 686 weight ppm of water, and heated to 100° C. 2.43 g of hexachloroplatinic acid solution (0.48% by weight based on elemental platinum) are metered in, whereupon the temperature of the reaction mixture rises to 125° C. and a clear product is formed. Complete conversion of the Si-bonded hydrogen is achieved after one hour at 100° C. to 110° C. The polyether-polysiloxane intermediate has a viscosity of about 590 mm²/s at 25° C.

55.18 g of N,N-dimethylpropylenediamine, 151.3 g of hexamethylene diisocyanate and 1 drop of di-n-butyltin dilaurate are then metered in succession and the mixture left to stir at 100° C. for one hour, during which a distinct increase in viscosity takes place. The intermediate thus obtained contains about 39.3 meq/100 g, of protonatable amine groups.

This is followed by the addition of 280 g of diethylene glycol monobutyl ether, 16.2 g of acetic acid (100%) and also 30.82 g of allyl glycidyl ether before heating to 130° C. The alkylation reaction ends after about 6 hours. The clear brownish product contains about 15.88 meq/100 g of protonatable amine groups. It is soluble in water by gentle stirring to form an emulsion.

EXAMPLE 7

200 g of an α,ω-dihydropolydiorganosiloxane having 0.055% by weight of Si-bonded hydrogen and a water content of 50 weight ppm are mixed with 14.6 g of ethylene glycol monoallyl ether and heated to 80° C. 0.34 g of hexachloroplatinic acid solution (0.48% strength based on elemental platinum) are then metered in, whereupon the temperature of the reaction mixture rises to 100° C. and a clear product is formed. Complete conversion of the Si-bonded hydrogen is achieved after one hour of stirring at 100° C. All volatile constituents are removed by distillation under reduced pressure. The polyether-polysiloxane intermediate thus obtained has a viscosity of about 100 mm²/s at 25° C. and an OH content of about 0.52 meq./g.

To 200 g of the polyether-polysiloxane intermediate are then metered in succession 25.51 g of N,N-bis(dimethylaminopropyl)-2-hydroxypropylamine and 17.5 g of hexamethylene diisocyanate and the mixture left to stir at 100° C. for one hour, during which a distinct increase in viscosity takes place. The intermediate thus obtained contains about 128.4 meq/100 g, of protonatable amine groups.

The batch is subsequently cooled down to 80° C., admixed with 70.4 g of diethylene glycol monobutyl ether and 38.74 g of methyl p-toluenesulfonate and left to stir at 80° C. for a further hour. The viscous oil thus obtained still contains 29.5 meq./100 g of protonatable amine groups. The product dissolves in water by gentle stirring to form an emulsion.

EXAMPLE 8

Comparison of Base Stability of Microemulsions Obtained from Examples 1-3 and Comparative Example 1

Emulsions 1-3 obtained as per Example 1, Comparative Example 1, Example 2 and Example 3 with a content of active substance of 40% by weight are diluted with water to an "actives" content of 5% by weight and adjusted to pH 5 with 10% acetic acid. This is followed by titration with 10% NaOH solution to the flocculation point. Table 1 indicates the result of the flocculation titration and documents the distinctly improved stability of the present invention's hydrophilic siloxane copolymers and their aqueous emulsions, compared with non-quaternized products (Comparative Example 1).

TABLE 1

| | pH | | | | | | | | | |
|---|---|---|---|---|---|---|---|---|---|---|
| | 5 | 6 | 7 | 8 | 9 | 10 | 11 | 12 | 13 | 14 |
| Comparative Emulsion 1 | + | + | + | +* | − | − | − | − | − | − |
| Emulsion 1 | + | + | + | + | + | + | + | + | +* | +* |
| Emulsion 2 | + | + | + | + | + | + | + | +* | +* | +* |
| Emulsion 3 | + | + | + | + | + | + | + | + | + | +* |

*Product flocculates out after about 48 h storage at 25° C.
+: emulsion storage stable for not less than 14 days at 25° C.
−: emulsion not stable While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hydrophilic siloxane copolymer prepared by the process of (a) reacting in a first step:
organopolysiloxane(s) (1) which have at least one Si-bonded hydrogen atom, with
substantially linear oligomeric or polymeric compounds (2) of the formula $$R^1\text{-}(A\text{-}C_nH_{2n})_m\text{-}A^1\text{-}H \qquad (I)$$

where $R^1$ is a monovalent optionally substituted hydrocarbyl radical capable of adding Si—H groups in a hydrosilylation reaction, A is a bivalent polar organic radical individually selected from the group consisting of —O—, —C(O)—O—, —O—C(O)—, —O—C(O)—O—, —C(O)—NH—, —NH—C(O)—, urethane radicals and urea radicals, $A^1$ is a bivalent polar organic radical individually selected from the group consisting of —O—, —NH— and —NR'—, where R' is a monovalent hydrocarbyl radical of 1 to 18 carbon atoms, n is an integer from 1 to 20, and m is zero or a positive integer, to form an -(A-$C_nH_{2n}$)$_m$-$A^1$H group-containing intermediate (4);

(b) reacting in a second step:
the resulting -(A-$C_nH_{2n}$)$_m$-$A^1$H group-containing intermediate (4) with at least one organic compound (5) which has two or more isocyanate groups per molecule, the reaction taking place in the presence of at least one further organic compound (6) which is reactive toward isocyanate groups and contains at least one tertiary amine group, to form an amino-group-containing intermediate (7); and (c) a third step, quaternizing:

the amino-group-containing intermediate (7) from step (b), partially or completely, with at least one alkylating agent (8), with the proviso that the water content of the compounds (1) and (2), is lower than 2000 weight ppm, in each case based on the total weight of compounds (1) and (2).

2. The copolymer of claim 1 wherein the organic compound(s) 5 are present in an amount sufficient to provide from 0.5 to 1.0 mole of isocyanate groups per mole of total isocyanate-reactive groups of intermediate (4) and further organic compound (6).

3. The hydrophilic siloxane copolymer of claim 1, wherein said organopolysiloxanes (1) have the formula $$H_g R_{3-g} SiO(SiR_2O)_o(SiRHO)_p SiR_{3-g}H_g \quad (III)$$

where each R individually is the same or different and is a monovalent optionally substituted hydrocarbyl radical having 1 to 18 carbon atoms per radical, g is 0, 1 or 2, o is 0 or an integer from 1 to 1500, and p is 0 or an integer from 1 to 200, with the proviso that there is at least one Si-bonded hydrogen atom per molecule.

4. The hydrophilic siloxane copolymer of claim 3 wherein said organopolysiloxanes (1) are α,ω-dihydrogendiorganopolysiloxanes.

5. The hydrophilic siloxane copolymer of claim 1, wherein A and $A^1$ in formula (I) are an oxygen atom —O—.

6. The hydrophilic siloxane copolymer of claim 1, wherein compound (2) is a polyether of the formula $$H_2C=CH-R^2-(OC_nH_{2n})_m-OH \quad (IV)$$

where $R^2$ is a divalent hydrocarbyl radical of 1 to 10 carbon atoms.

7. The hydrophilic siloxane copolymer of claim 1, wherein compound (5) is a diisocyanate of the formula $$O=C=N-R^3-N=C=O \quad (V)$$

where R3 is a divalent hydrocarbyl radical having 4 to 40 carbon atoms per radical.

8. The hydrophilic siloxane copolymer of claim 1, wherein the second step (b) utilizes further organic compounds (6) selected from the group consisting of $$HX-R^5-NR^4_2 \quad (VI),$$

$$HX-R^6(NR^4_2)_2 \quad (VII),$$

$$HX-R^7(NR^4_2)_3 \quad (VIII),$$

$$(HX)_2R^6-NR^4_2 \quad (IX),$$

$$HR^8N-R^5-NR^4_2 \quad (X),$$

where $R^4$ is an R radical which may optionally contain oxygen, sulfur or nitrogen atoms, $R^5$ is a divalent hydrocarbyl radical of 1 to 100 carbon atoms, which may be interrupted by or substituted by oxygen, sulfur or nitrogen atoms, $R^6$ is a trivalent organic radical having 1 to 100 carbon atoms per radical, $R^7$ is a tetravalent organic radical having 1 to 100 carbon atoms per radical, $R^8$ is a hydrogen atom or $R^4$, and X is an oxygen atom or a sulfur atom.

9. The hydrophilic siloxane copolymer of claim 8, wherein $R^4$ is selected from the group consisting of methyl, ethyl, and propyl, said methyl, ethyl, and propyl radicals optionally substituted by one or more of a hydroxyl radical or a peralkylated amine radical, $R^5$ is a bivalent $C_{1-50}$ hydrocarbyl radical optionally interrupted by or substituted by oxygen, sulfur, or nitrogen atoms, $R^6$ is a trivalent $C_{1-100}$ hydrocarbyl radical which contains at least one oxygen atom, and $R^7$ is a tetravalent $C_{1-20}$ hydrocarbyl radical which contains at least one oxygen atom.

10. The hydrophilic siloxane copolymer of claim 1, wherein the third step (c) utilizes at least one alkylating agent (8) selected from the group consisting of methyl chloride, methyl iodide, dodecyl bromide, benzyl chloride, chloroacetic acid, dimethyl sulfate and methyl p-toluenesulfonate.

11. An emulsion, comprising (A) at least one hydrophilic siloxane copolymer of claim 1, and (B) water.

12. A process for producing an emulsion of claim 11, by mixing (A) at least one hydrophilic siloxane copolymer of claim 1, with (B) water.

13. The hydrophilic siloxane copolymer of claim 1, wherein the second step (b) employs at least one organic compound (6) selected from the group consisting of $$HX-R^5-NR^4_2 \quad (VI),$$

$$HX-R^6(NR^4_2)_2 \quad (VII),$$

$$HX-R^7(NR^4_2)_3 \quad (VIII),$$

$$HR^8N-R^5-NR^4_2 \quad (X),$$

where $R^4$ is an R radical which may optionally contain oxygen, sulfur or nitrogen atoms, $R^5$ is a divalent hydrocarbyl radical of 1 to 100 carbon atoms, which may be interrupted by or substituted by oxygen, sulfur or nitrogen atoms, $R^6$ is a trivalent organic radical having 1 to 100 carbon atoms per radical, $R^7$ is a tetravalent organic radical having 1 to 100 carbon atoms per radical, $R^8$ is a hydrogen atom or $R^4$, and X is an oxygen atom or a sulfur atom.

14. The hydrophilic siloxane copolymer of claim 1, wherein compound (2) is used in stoichiometric excess over silicon-bonded hydrogens of organopolysiloxanes (1) such that silicon-bonded hydrogens are completely reacted following step (a).

15. The hydrophilic siloxane copolymer of claim 1 wherein an organic compound (6) is selected from the group consisting of N,N-dimethylethanolamine, N,N-bis(dimethyl-3-aminopropyl)amine, N,N-dimethylpropylenediamine, and N,N-bis(dimethylaminopropyl)-2-hydroxypropylene.

16. A process for preparing a hydrophilic siloxane copolymer comprising (a) reacting in a first step:

organopolysiloxane(s) (1) which have at least one Si-bonded hydrogen atom, with substantially linear oligomeric or polymeric compounds (2) of the formula $$R^1\text{-}(A\text{-}C_nH_{2n})_m\text{-}A^1\text{-}H \quad (I)$$

where $R^1$ is a monovalent optionally substituted hydrocarbyl radical capable of adding Si—H groups in a hydrosilylation reaction, A is a bivalent polar organic radical individually selected from the group consisting of —O—, —C(O)—O—, —O—C(O)—, —O—C(O)—O—, —C(O)—NH—, —NH—C(O)—, urethane radicals, and urea radicals, $A^1$ is a bivalent polar organic radical individually selected from the group consisting of —O—, —NH— and —NR$^2$—, where $R^2$ is a monovalent hydrocarbyl radical of 1 to 18 carbon atoms, n is an integer from 1 to 20, and m is zero or a positive integer, to form an H-$A^1$-group-containing intermediate (4);

(b) reacting in a second step:

the resulting H-$A^1$-group-containing intermediate (4) with at least one organic compound (5) which has two or more isocyanate groups per molecule, the reaction taking place in the presence of at least one further organic compound (6) which is reactive toward isocyanate groups and contains at least one tertiary amine group, to form an amino-group-containing intermediate (7); and (c) a third step, quaternizing:

the amino-group-containing intermediate (7) from step (b), partially or completely, with at least one alkylating agent (8), with the proviso that the water content of the compounds (1) and (2), is lower than 2000 weight ppm, in each case based on the total weight of compounds (1) and (2).

17. The process of claim 16, wherein the organic compound(s) (5) which have two or more isocyanate groups per molecule, are used in amounts of 0.5 to 1.0 mol of isocyanate group per mole of the sum total of isocyanate-reactive groups present in the intermediates (4) and the organic compounds (6).

18. The process of claim 16, wherein the second step (b) employs at least one organic compound (6) selected from the group consisting of $$HX—R^5—NR^4_2 \quad (VI),$$

$$HX—R^6(NR^4_2)_2 \quad (VII),$$

$$HX—R^7(NR^4_2)_3 \quad (VIII),$$

$$HR^8N—R^5—NR^4_2 \quad (X),$$

where $R^4$ is an R radical which may optionally contain oxygen, sulfur or nitrogen atoms, $R^5$ is a divalent hydrocarbyl radical of 1 to 100 carbon atoms, which may be interrupted by or substituted by oxygen, sulfur or nitrogen atoms, $R^6$ is a trivalent organic radical having 1 to 100 carbon atoms per radical, $R^7$ is a tetravalent organic radical having 1 to 100 carbon atoms per radical, $R^8$ is a hydrogen atom or $R^4$, and X is an oxygen atom or a sulfur atom.

19. The process of claim 16, wherein compound (2) is used in stoichiometric excess over silicon-bonded hydrogens of organopolysiloxanes (I) such that silicon-bonded hydrogens are completely reacted following step (a).

20. The process of claim 16, wherein an organic compound (6) is selected from the group consisting of N,N-dimethylethanolamine, N,N-bis(dimethyl-3-aminopropyl)amine, N,N-dimethylpropylenediamine, and N,N-bis(dimethylaminopropyl)-2-hydroxypropylene.

* * * * *